Patented Sept. 20, 1932

1,878,463

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

METHOD OF MAKING HALOGENATED BENZOIC ACID DERIVATIVES

No Drawing.   Application filed April 6, 1929.   Serial No. 353,265.

The present invention relates to the preparation of halogen substituted derivatives of benzoic acid, and more particularly to methods involving the chlorination of the corresponding halogen-substituted derivatives of toluene and the subsequent hydrolysis thereof.

In a pending application, Serial No. 145,375, filed October 30, 1926, I have described an improved method of making benzoic acid substantially free from ring-chlorinated impurities. Such method comprises the steps of chlorinating toluene to form benzo-trichloride, purifying the latter by fractional distillation, treating the purified benzo-trichloride with approximately a molecular equivalent of water in the presence of a catalyst, e. g. anhydrous ferric chloride, to form benzoyl chloride, fractionating and finally hydrolyzing the latter with boiling water in excess. The resulting benzoic acid is remarkably free from chlorine-containing impurities and is much superior to the product made by other processes.

I have now found that this same method, with suitable modifications, may be applied for the synthesis of certain ring-substituted derivatives of benzoic acid, notably the halogen substituted derivatives thereof. The invention, then, consists of the procedure hereinafter fully described and particularly pointed out in the claims, the following description setting forth but a few of the various ways in which the principle of the invention may be used.

In proceeding in accordance with my invention, a substituted toluene derivative, such as a mono- or poly-chlor-toluene, is treated with chlorine in the presence of a phosphorus halide, e. g. phosphorus trichloride, the temperature of reaction being maintained preferably at or above the atmospheric boiling point of such substituted toluene, until the methyl group of the toluene derivative is completely chlorinated, yielding the corresponding substituted derivative of benzo-trichloride. The latter is then purified by distilling in a super-refractionator, and thereupon treated with water in equimolecular proportion at a temperature preferably between 90° and 100° C., and in the presence of anhydrous ferric chloride in catalytic amount, e. g. approximately one half of one per cent. The resulting product is the substituted derivative of benzoyl chloride, which in turn is purified by fractional distillation, and then treated with boiling water in proportion of about 4 parts of water to one part benzoyl chloride derivative. The hydrolysis at this stage may also be carried out at a somewhat lower temperature if, instead of water alone, an alkali is used, for which purpose caustic alkali, alkali metal carbonate, or alkaline earth metal hydroxide or carbonate are suitable. Naturally when water alone is used the substituted benzoic acid will be obtained direct, whereas in case an alkali is used, the corresponding salt of the acid is the immediate product. It is, of course, also possible to use only just enough alkali to neutralize the hydrochloric acid liberated by the hydrolysis, when the free substituted benzoic acid would likewise be obtained directly.

The importance of effecting the hydrolysis of the benzo-trichloride derivative in two separate and distinct stages is especially to be emphasized, and is an essential feature of my improved method. While the intermediate product obtained by the chlorination of the toluene derivative is predominantly the corresponding benzo-trichloride derivative, nevertheless such product invariably contains certain lower chlorinated and ring chlorinated compounds as impurities. Among the latter some have boiling points so close to that of the benzo-trichloride derivative that even the most careful fractionation of the mixture will not suffice to separate the impurities completely. Accordingly if such impure benzo-trichloride derivative were hydrolyzed directly to the corresponding substituted benzoic acid in one step as in previous methods, the latter would not be obtained free from the halogen-containing impurities. I have found, however, that a substantially complete separation from the remaining chlorinated impurities may be realized if the benzo-trichloride derivative is first partially hydrolyzed to the benzoyl chloride derivative, the latter fractionated, and such fractionated product then hydrolyzed to form the benzoic acid derivative. I have found that it is possible to separate the intermediate hydrolytic product, the substituted benzoyl chloride, from its accompanying impurities far more completely by fractionation than in the case of the benzo-trichloride derivative, due to greater variation in boiling points of the latter compound and its accompanying impurities. A further advantange is that iron compounds, derived from the catalyst employed in the first hydrolytic operation, are completely separated by the fractionation of the intermediate benzoyl chloride derivative, and the final acid product is accordingly obtained directly in a highly purified condition without trace of discoloration due to the presence of iron compounds. It is to be noted that, whereas the use of a catalyst is important for hydrolyzing the benzo-trichloride derivatives, the benzoyl-chloride derivatives are readily hydrolyzed by water alone without any catalyst.

As regards the aforementioned catalyst, while I prefer to use anhydrous ferric chloride, other anhydrous metallic chlorides are also effective for the purpose, such as zinc chloride, cobalt chloride, bismuth chloride, etc. The proper procedure is to add the anhydrous catalyst first to the benzo-trichloride derivative before introducing the water. If the metallic chloride were dissolved first in water and then added to the benzo-trichloride derivative it would have no catalytic effect. Another catalyst suitable for the present reaction is concentrated sulphuric acid.

Anhydrous ferric chloride, however, is difficult to prepare by the usual methods, and also to keep in storage for any length of time without deterioration. I have devised a particularly advantageous means of preparing the anhydrous ferric chloride catalyst for the present reaction which avoids the difficulties referred to. For this purpose I take a strong aqueous solution of ferric chloride and heat it with sufficient benzoyl chloride, or substituted derivative thereof, to react with all of the water present. The product of such reaction is a mixture of benzoic acid, or the corresponding derivative thereof, and anhydrous ferric chloride. To this catalyst so prepared the benzo-trichloride derivative is added and the whole heated to the desired reaction temperature, whereupon the required amount of water for hydrolyzing the latter compound to the corresponding benzoyl chloride derivative is introduced, as already described. Reaction proceeds as well with this catalyst as with freshly prepared sublimed ferric chloride. Similar procedure can likewise be employed for the preparation of other anhydrous metallic chloride catalysts suitable for the present reaction, as well as the corresponding metallic bromides. The benzoic acid derivative produced as above remains in the still residue from the fractionation of the benzoyl chloride derivative, from which it may easily be separated and, if desired, added to the main body of final product.

In commercial operations for chlorinating toluene in the nucleus to prepare the monochlor derivative the product obtained consists of a mixture of the ortho- and para-chlor-toluenes. The two isomers are extremely difficult to separate by ordinary means, such as distillation. However, the mixed compounds may be converted, in accordance with the present method, to the corresponding chlor-benzoic acids, which may be separated with comparative ease by crystallization from a solvent, such as water or benzol, or by other suitable means.

Example

A mixture of ortho- and para-chlor toluenes is chlorinated in the presence of phosphorus trichloride as catalyst at a temperature of approximately 160° to 180° C. until a sample, on cooling to 20° C., has a specific gravity 1.485. The reaction product is washed with water and caustic soda solution, and finally fractionally distilled under reduced pressure, e. g. 24 mm., at which pressure the fraction obtained at 128° to 132° C. consists of a mixture of ortho- and para-chlor-benzo-trichloride. Yield approximately 85 per cent.

To the purified mixed product, obtained in the foregoing manner, is then added from 0.1 to 0.2 per cent anhydrous ferric chloride, and the whole is heated to between 100° and 120° C., when 1 mole water is gradually introduced, either as liquid or vapor. Hydrochloric acid is rapidly evolved, and when the water has all been added the mixture is stirred for about ½ hour longer to complete the reaction. The reaction product is then fractionally distilled under reduced pressure, e. g. at 25 mm. pressure, whereat the fraction obtained at 115° to 120° C. consists of a mixture of ortho- and para-chlor-benzoyl chloride. Yield approximately 83 per cent.

Instead of adding anhydrous ferric chloride in the preceding operation, the catalyst may be prepared by treating a strong solution of ferric chloride with chlor-benzoyl chloride as previously described.

The mixture of chlor-benzoyl chloride derivatives is then hydrolyzed by boiling with an excess of water. The ortho- and para-chlor benzoic acids are separated from the product, and purified by suitable means, as by extraction with hot water and crystallization of the ortho compound dissolved by such treatment, while the para-compound remains undissolved. Yield approximately 95 per cent.

While in the foregoing description reference has been made particularly to chlorinating the methyl group of a substituted toluene derivative and subsequently hydrolyzing the trichlorinated compound so obtained, it is understood that exactly analogous procedure may be employed which involves brominating the toluene derivative and hydrolyzing the tri-brom compound formed thereby. Likewise the di-halogen benzoic acids may be prepared from the corresponding di-halogenated toluenes.

Other modes of applying the principle of my invention may be employed instead of the one explained, change being made as regards the method herein disclosed, provided step or steps stated by any of the following claims or the equivalent of such stated step or steps be employed.

I therefore particularly point out and distinctly claim as my invention.

1. The method of making a halogenated benzoic acid which comprises chlorinating the corresponding halogen substituted toluene, whereby chiefly the halogenated benzo-trichloride is produced, purifying the latter by fractional distillation, reacting such purified compound and water in equimolecular proportions in the presence of anhydrous ferric chloride, fractionally distilling the halogenated benzoyl chloride so obtained and then hydrolyzing the latter.

2. The method of making a halogenated benzoic acid which comprises chlorinating the corresponding halogen substituted toluene, whereby chiefly the halogenated benzo-trichloride is produced, purifying the latter by fractional distillation, reacting such purified compound and water in equimolecular proportions in the presence of a catalyst, fractionally distilling the halogenated benzoyl chloride so obtained and then hydrolyzing the latter.

3. The method of making a chlor-benzoic acid which comprises chlorinating a chlor-toluene to produce the corresponding chlor-benzo-trichloride, purifying the latter by fractional distillation, heating the purified compound with addition of anhydrous ferric chloride to a temperature of about 100° to 120° C. and adding gradually thereto an approximately equimolecular proportion of water, fractionally distilling the chlor-benzoyl chloride product and boiling the so purified product with an excess of water.

Signed by me this 4th day of April, 1929.

EDGAR C. BRITTON.